United States Patent
Wang et al.

(10) Patent No.: US 10,095,284 B2
(45) Date of Patent: Oct. 9, 2018

(54) PORTABLE ELECTRONIC DEVICE

(71) Applicant: HTC Corporation, Taoyuan (TW)

(72) Inventors: Yung-Hsiang Wang, Taoyuan (TW); Li-Hsun Chang, Taoyuan (TW); Ting-An Kuo, Taoyuan (TW); Cheng-Te Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 6 days.

(21) Appl. No.: 15/009,825

(22) Filed: Jan. 29, 2016

(65) Prior Publication Data
US 2017/0220081 A1    Aug. 3, 2017

(51) Int. Cl.
*G06F 1/20* (2006.01)
*G06F 1/16* (2006.01)

(52) U.S. Cl.
CPC ............ *G06F 1/203* (2013.01); *G06F 1/1628* (2013.01); *G06F 1/1635* (2013.01)

(58) Field of Classification Search
CPC ....... G06F 1/203; G06F 1/1628; G06F 1/1635
See application file for complete search history.

(56) References Cited

U.S. PATENT DOCUMENTS

| | | | | |
|---|---|---|---|---|
| 5,394,306 A * | 2/1995 | Koenck | ................ | H05K 7/1417 |
| | | | | 174/544 |
| 8,432,696 B2 * | 4/2013 | Ribas | ................ | H05K 7/20454 |
| | | | | 165/104.33 |
| 2010/0173193 A1 * | 7/2010 | Kim | ................ | H01M 2/021 |
| | | | | 429/178 |
| 2013/0136966 A1 * | 5/2013 | Bhardwaj | .......... | H05K 7/20481 |
| | | | | 429/94 |
| 2014/0321058 A1 * | 10/2014 | Fujieda | ................ | G06F 1/203 |
| | | | | 361/700 |
| 2015/0155220 A1 * | 6/2015 | Nguyen | ................ | H01L 23/3733 |
| | | | | 257/707 |
| 2015/0220122 A1 * | 8/2015 | Rhee | ................ | G06F 1/203 |
| | | | | 361/679.52 |
| 2015/0253823 A1 * | 9/2015 | Han | ................ | G06F 1/203 |
| | | | | 361/679.52 |

FOREIGN PATENT DOCUMENTS

CN    103716424    4/2014
CN    204090411    1/2015
(Continued)

OTHER PUBLICATIONS

"Office Action of Taiwan Counterpart Application," dated May 22, 2017, p. 1-p. 7.

*Primary Examiner* — David M Sinclair
*Assistant Examiner* — Theron S Milliser
(74) *Attorney, Agent, or Firm* — JCIPRNET

(57) ABSTRACT

A portable electronic device including a shell, a cover plate, a battery module, a heat generating element and a heat pipe. The shell includes an arc-shaped surface. The cover plate and the shell jointly define an accommodating space. The battery module is disposed in the accommodating space, and the battery module and the arc-shaped surface have a gap therebetween. The heat generating element is disposed in the accommodating space. The heat pipe is disposed in the gap and thermally coupled to the heat generating element. Moreover, the battery module also includes a stepped groove, and the heat pipe is disposed in the stepped groove.

6 Claims, 3 Drawing Sheets

(56) References Cited

FOREIGN PATENT DOCUMENTS

| | | |
|---|---|---|
| CN | 104582384 | 4/2015 |
| CN | 104596334 | 5/2015 |
| CN | 204335247 | 5/2015 |
| TW | 201531197 | 8/2015 |
| TW | 201603679 | 1/2016 |
| TW | M515138 | 1/2016 |

* cited by examiner

PORTABLE ELECTRONIC DEVICE

TECHNICAL FIELD

The invention relates to an electronic device, and particularly relates to a portable electronic device.

BACKGROUND

In recent years, along with quick development of technology industry, portable electronic devices such as smart phones, tablet computers, etc., are widely used, and are developed towards a design trend of being light, slim, convenient with multifunction and artistic appearance, etc., so as to provide more choices to the user. Generally, the portable electronic device is equipped with heat generating elements such as central processing unit (CPU), etc., so that a heat dissipation device is configured to decrease the temperature of the heat generating elements, so as to ensure normal operation of the heat generating elements.

However, under the development trend of the profile of the portable electronic device getting thinner and thinner, an overall thickness of the portable electronic device is also continuously decreased, such that the accommodating space for the heat dissipation device is strictly limited, which influences heat dissipation performance of the portable electronic device.

SUMMARY

The invention is directed to a portable electronic device, which has a smooth arc-shaped shell, and an overall thickness thereof is relatively thin.

The invention provides a portable electronic device including a shell, a cover plate, a battery module, a heat generating element and a heat pipe. The shell includes an arc-shaped surface. The cover plate and the shell jointly define an accommodating space. The battery module is disposed in the accommodating space, and a gap exists between the battery module and the arc-shaped surface. The heat generating element is disposed in the accommodating space. The heat pipe is disposed in the gap and thermally coupled to the heat generating element.

The invention provides a portable electronic device including a shell, a cover plate, a battery module, a heat generating element and a heat pipe. The cover plate and the shell jointly define an accommodating space. The battery module includes an extending portion protruding from a surface of the battery module for defining a stepped groove together with the surface. The heat generating element is disposed in the accommodating space. The heat pipe is disposed in the stepped groove and thermally coupled to the heat generating element.

According to the above descriptions, the shell of the portable electronic device has an arc-shaped surface, so that a gap exists between the arc-shaped surface of the shell and an upper surface of the battery module, and the heat pipe is disposed in the gap. Moreover, the battery module of the portable electronic device may also adopt a stepped-shaped design, and the heat pipe is disposed in the stepped groove of the battery module. In this way, the portable electronic device of the invention may be configured with the heat pipe without additionally increasing an overall thickness thereof, by which heat dissipation efficiency of the portable electronic device is improved, and an internal space usage of the portable electronic device can be more compact.

In order to make the aforementioned and other features and advantages of the invention comprehensible, several exemplary embodiments accompanied with figures are described in detail below.

DESCRIPTION OF EMBODIMENTS

Figure 1:
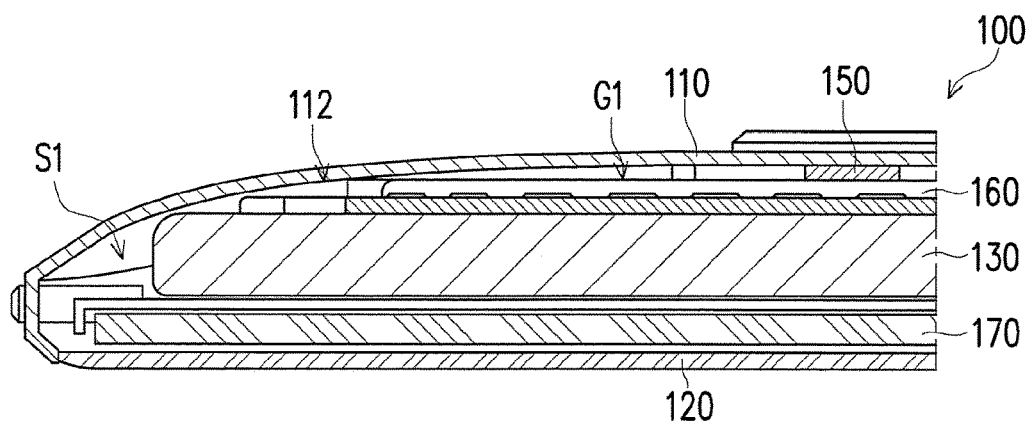
FIG. 1 is a partial cross-sectional view of a portable electronic device according to an exemplary embodiment.
Figure 2:
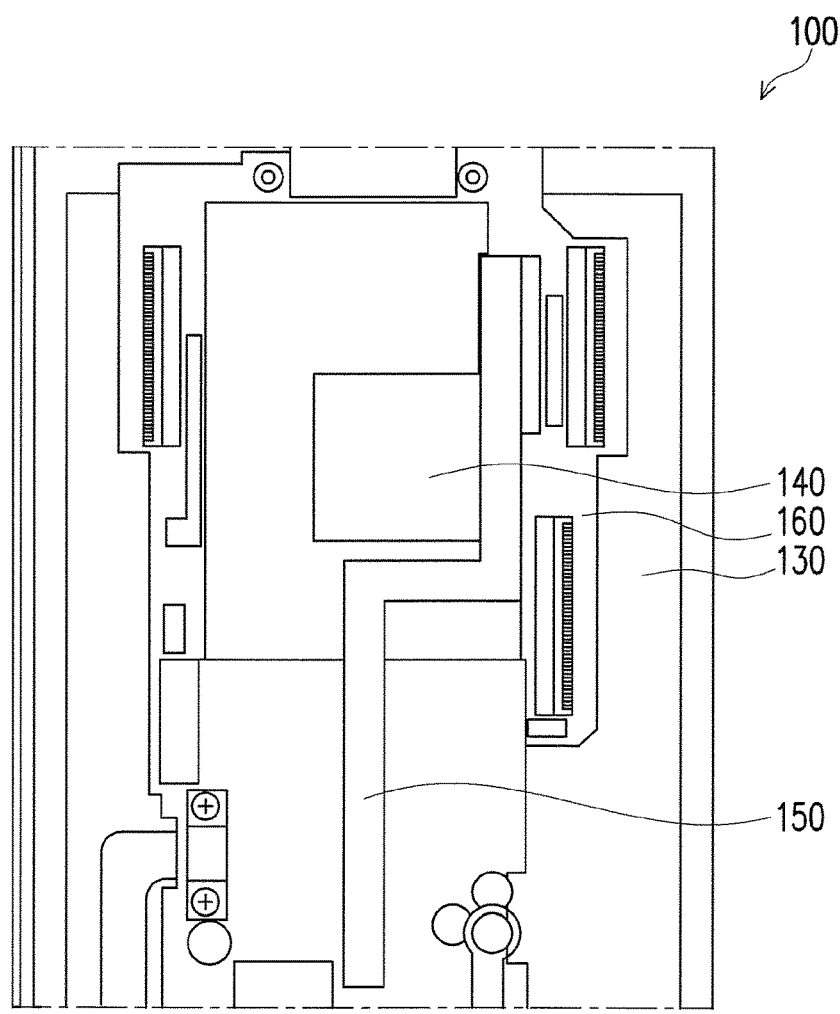
FIG. 2 is a top view of a part of components of the portable electronic device of FIG. 1.

Referring to FIG. 1 and FIG. 2, in the present embodiment, the portable electronic device 100 is, for example, a thin mobile device such as a smart phone or a tablet computer, etc. The portable electronic device 100 includes a shell 110, a cover plate 120, a battery module 130, a heat generating element 140 and a heat pipe 150. The shell 110 includes an arc-shaped surface 112. To be specific, the shell 110 can be an arc-shaped shell as shown in FIG. 1 to cope with human body engineering, so as to improve a holding feeling for a user of the portable electronic device 100, and the arc-shaped surface 112 can be an inner surface of the arc-shaped shell. The cover plate 120 and the shell 110 jointly define an accommodating space S1. The battery module 130 is disposed in the accommodating space S1, and a gap G1 exists between the battery module 130 and the arc-shaped surface 112. The heat generating element 140 is also disposed in the accommodating space S1, and the heat pipe 150 is disposed in the gap G1 between the battery module 130 and the arc-shaped surface 112, and is thermally coupled to the heat generating element 140.

Based on such configuration, since the shell 110 of the present embodiment is the arc-shaped shell, and the inner surface thereof is the arc-shaped surface 112, and an upper surface of the battery module 130 is a plane, the gap G1 as shown in FIG. 1 is formed between the arc-shaped surface 112 and the upper surface of the battery module 130, and the heat pipe 150 is disposed in the gap G1. Therefore, the portable electronic device 100 of the present embodiment may configure the heat pipe 150 without additionally increasing an overall thickness, which improves heat dissipation efficiency of the portable electronic device 100, and improves an internal space usage of the portable electronic device 100.

Furthermore, the portable electronic device 100 may further include a circuit board 160 and a display module 170, where the circuit board 160 is disposed in the accommodating space S1, and the heat generating element 140 is, for example, a central processing unit (CPU) of the portable electronic device 100, and is disposed on the circuit board 160. The number of the heat generating element 140 can be plural, which are all disposed on the circuit board 160 and are thermally coupled to the heat pipe 150. The display module 170 is disposed in the accommodating space S1 and is located between the cover plate 120 and the battery module 130. In the present embodiment, the cover plate 120 is, for example, a transparent cover glass, which may have a touch-control function, and cover the display module 170 to provide protection, and a user may see images displayed by the display module 170 through the transparent cover plate 120.

In the present embodiment, the circuit board 160 and the heat generating element 140 disposed thereon can also be disposed in the gap G1 between the shell 110 and the battery module 130. To be specific, the circuit board 160 can be disposed between the battery module 130 and the heat pipe 150 as shown in FIG. 1 to facilitate the heat pipe 150 to be thermally coupled to the heat generating element 140 on the circuit board 160. In the present embodiment, the battery module 130 may lean against the arc-shaped surface 112 of the shell 110, and the upper surface of the battery module 130 and the arc-shaped surface of the shell 110 may jointly define the gap G1. The heat pipe 150, the circuit board 160 and the heat generating element 140 thereon are disposed in the gap G1.

Figure 3:
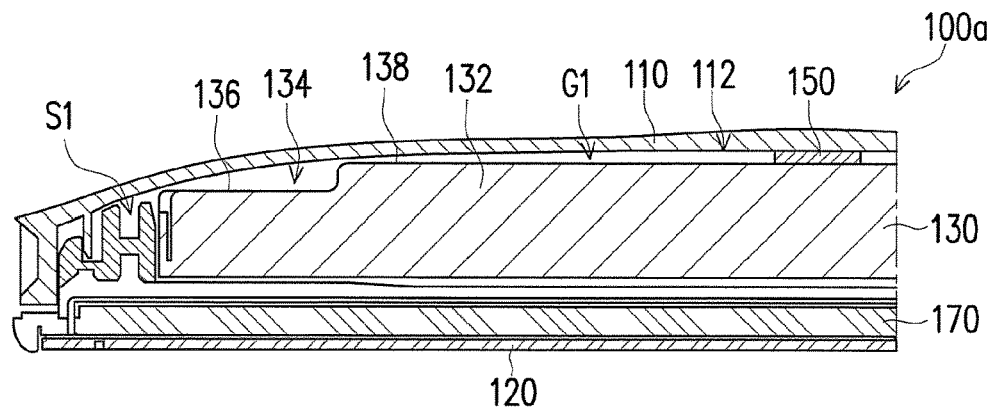
FIG. 3 is a partial cross-sectional view of a portable electronic device according to an exemplary embodiment.
Figure 4:
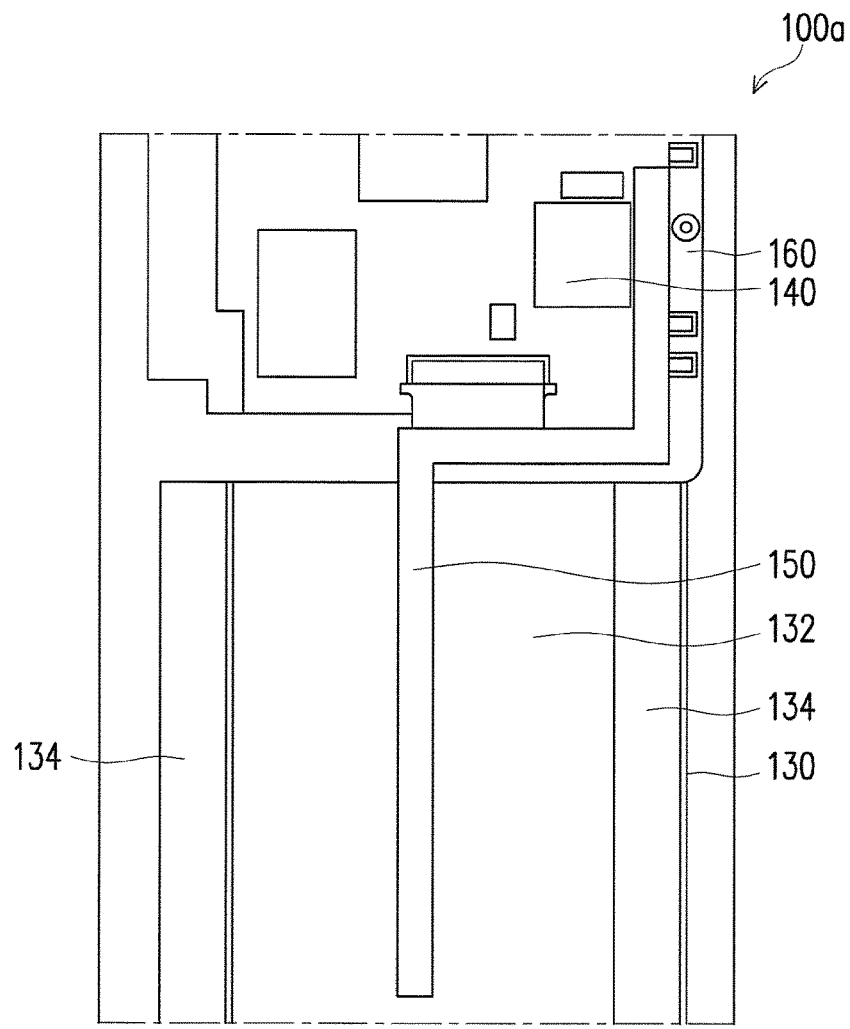
FIG. 4 is a top view of a part of components of the portable electronic device of FIG. 3.

Referring to FIG. 3 and FIG. 4, different to the embodiment in FIG. 1 and FIG. 2, in the present embodiment, the circuit board 160 is disposed adjacent to a side surface of the battery module 130 as shown in FIG. 4. Further, the circuit board 160 and the battery module 130 are disposed in the accommodating space S1 in a coplanar manner. Under such configuration, the battery module 130 may include an extending portion 132 as shown in FIG. 3, and the extending portion 132 protrudes from an upper surface 136 of the battery module 130, and the extending portion 132 and the upper surface 136 of the battery module 130 define a stepped groove 134 together, and a top surface 138 of the extending portion 132 and the arc-shaped surface 112 of the shell 110 jointly define the gap G1. The heat pipe 150 of the present embodiment is disposed in the gap G1, and laterally extends to the circuit board 160 for being thermally coupled to the heat-generating element 140 disposed on the circuit board 160.

With such configuration, since the circuit board 160 is disposed adjacent to the side surface of the battery module 130 instead of being stacked on top of the battery module, the battery module 130 can be configured with the extending portion 132 extending towards the arc-shaped circuit 112, such that a volume of the battery module 130 can be increased without increasing an overall thickness of the portable electronic device 100a, so as to improve the battery capacity and endurance of the probable electronic device 100a. Moreover, in the present embodiment, the heat pipe 150 can be disposed in the gap G1 between the arc-shaped surface 112 of the shell 110 and the top surface 138 of the extending portion 132. In this way, the portable electronic device 100a of the present embodiment may be configured with the heat pipe 150 without additionally increasing the overall thickness, by which the heat dissipation efficiency of the portable electronic device 100a is improved, and an internal space usage of the portable electronic device 100a can be more compact.

Besides, in the present embodiment, the stepped groove 134 of the battery module 130 can be symmetrically disposed as shown in FIG. 4, such that the profile of the top of the battery module 130 is close to a symmetric curve. In this way, the appearance of the shell 110 covering the battery module 130 may present a smooth arc-shaped, so as to cope with the human body engineering to improve a holding feeling for the user of the portable electronic device 100a.

Figure 5:
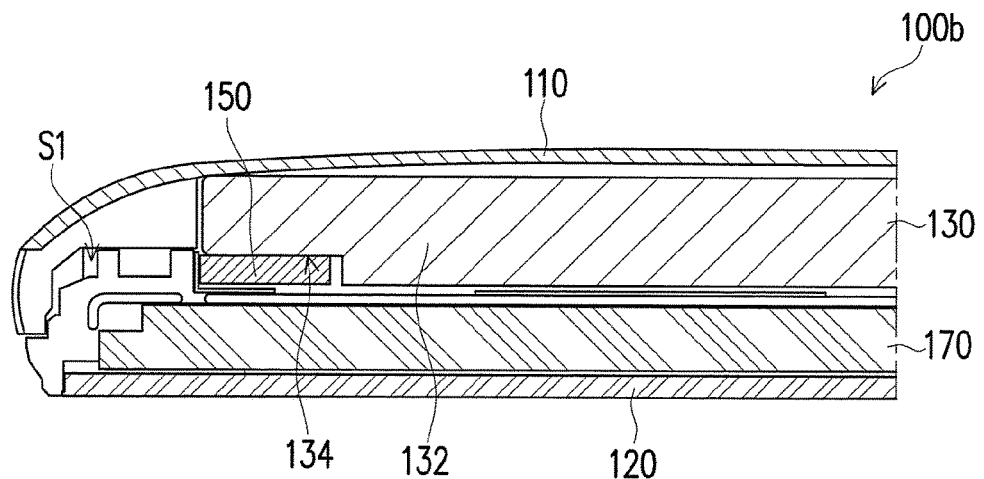
FIG. 5 is a partial cross-sectional view of a portable electronic device according to an exemplary embodiment.

Referring to FIG. 5, different to the embodiment in FIG. 3 and FIG. 4, in the present embodiment, the battery module 130 also includes the extending portion 132 protruding from a surface of the battery module 130 for defining the stepped groove 134 together with the surface. However, in the present embodiment, the surface and the stepped groove 134 both face the cover plate 120. Namely, the extending portion 132 of the present embodiment protrudes from the surface of the battery module 130 facing the cover plate 120 to define the stepped groove 134 facing the cover plate 120. The heat pipe 150 is disposed in the stepped groove 134, and is thermally coupled to the heat generating element. In the present embodiment, the shell 110 is unnecessary to be an arc-shaped shell.

In the present embodiment, configuration of the circuit board can be similar to the configuration method of FIG. 4, where the circuit board is disposed adjacent to a side surface of the battery module 130, and the heat generating element is disposed on the circuit board. Namely, the circuit board and the battery module 130 of the present embodiment can be disposed in the accommodating space S1 in a coplanar manner, and the heat pipe 150 disposed in the stepped groove 134 of the battery module 130 may laterally extend to the circuit board for thermally coupling to the heat generating element. Certainly, the present embodiment is only an example, an in the other embodiments, the circuit board can also be stacked on the battery module 130 according to a configuration method similar to that of FIG. 2, and the configuration method of the circuit board and the method for forming thermal coupling between the heat pipe 150 and the heat generating element are not limited by the invention.

According to such configuration, based on the stepped design of the battery module 130, the heat pipe 150 is disposed in the stepped groove 134 of the battery module 130. Therefore, the portable electronic device 100b of the present embodiment may be configured with the heat pipe 150 without additionally increasing the overall thickness thereof, by which heat dissipation efficiency of the portable electronic device 100b is improved, and an internal space usage of the portable electronic device 100b can be more compact.

Figure 6:
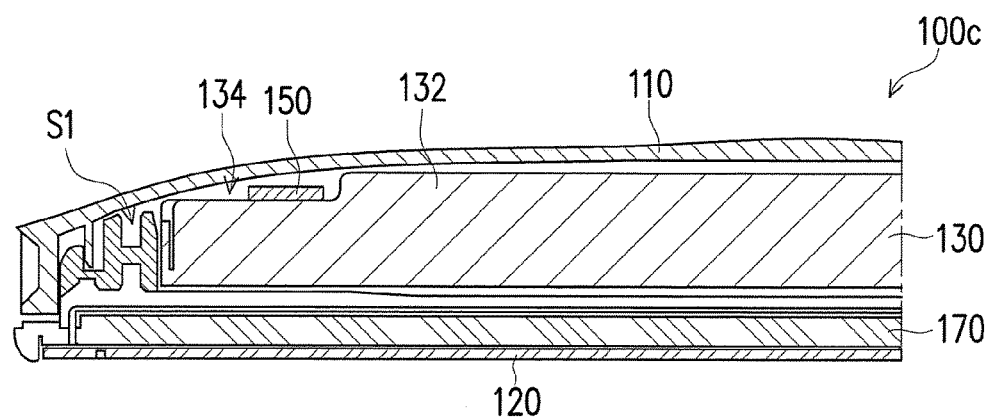
FIG. 6 is a partial cross-sectional view of a portable electronic device according to an exemplary embodiment.

Referring to FIG. 6, different to the embodiment in FIG. 3 and FIG. 4, in the present embodiment, the battery module 130 also includes the extending portion 132 protruding from a surface of the battery module 130 for defining the stepped groove 134 together with the surface. Moreover, in the present embodiment, the surface and the stepped groove 134 both face the shell 110, and a top surface of the extending portion 132 may lean against the arc-shaped surface 112 of the shell 110. Namely, the extending portion 132 of the present embodiment protrudes from of the surface of the battery module 130 facing the shell 110 to define the stepped groove 134 facing the shell 110. The heat pipe 150 is disposed in the stepped groove 134 facing the shell 110, and is thermally coupled to the heat generating element.

In the present embodiment, configuration of the circuit board can be similar to the configuration of FIG. 4, wherein the circuit board is disposed adjacent to a side surface of the battery module 130, and the heat generating element is disposed on the circuit board. Namely, the circuit board and the battery module 130 of the present embodiment can be disposed in the accommodating space S1 in a substantially coplanar manner, and the heat pipe 150 disposed in the stepped groove 134 of the battery module 130 may extend to the circuit board for being thermally coupled to the heat generating element.

With such configuration, the battery module 130 of the present embodiment is configured with the extending portion 132 extending towards the arc-shaped circuit 112 of the shell 110, such that a volume of the battery module 130 can be increased without increasing an overall thickness of the portable electronic device 100c, so as to improve the battery capacity and endurance of the probable electronic device 100c. Moreover, the portable electronic device 100c of the present embodiment may be configured with the heat pipe 150 without additionally increasing the overall thickness thereof, by which heat dissipation efficiency of the portable electronic device 100c is improved, and an internal space usage of the portable electronic device 100c can be more compact.

Besides, in the present embodiment, the stepped groove 134 of the battery module 130 can be symmetrically disposed as shown in FIG. 4, such that a profile of the top of the battery module 130 is close to a symmetric curve. In this way, the appearance of the shell 110 covering the battery module 130 may present a smooth arc-shaped, so as to cope with the human body engineering to improve a holding feeling for the user of the portable electronic device 100c.

In summary, the shell of the portable electronic device of the invention has an arc-shaped surface, so that the arc-shaped surface of the shell and an upper surface of the battery module form a gap therebetween, and the heat pipe is disposed in the gap. Moreover, the battery module of the portable electronic device may also adopt a stepped-shaped design, and the heat pipe is disposed in the stepped groove of the battery module. In this way, the portable electronic device of the invention may be configured with the heat pipe without additionally increasing an overall thickness thereof, by which the heat dissipation efficiency of the portable electronic device is improved, and the internal space usage of the portable electronic device can be more compact.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A portable electronic device, comprising:
   a shell, comprising an arc-shaped surface;
   a cover plate, jointly defining an accommodating space with the shell;
   a battery module, disposed in the accommodating space and leaning against the arc-shaped surface, wherein a gap exists between the battery module and the arc-shaped surface, and an upper surface of the battery module and the arc-shaped surface jointly define the gap;
   a heat generating element, disposed in the accommodating space;
   a heat pipe, disposed in the gap, and thermally coupled to the heat generating element; and
   a circuit board, disposed in the accommodating space, wherein the heat generating element is disposed on the circuit board, the heat pipe is extended between the circuit board and the heat generating element, and the heat pipe and the heat generating element are arranged in side-by-side manner from a top view of the circuit board.

2. The portable electronic device as claimed in claim 1, wherein the circuit board is disposed between the battery module and the heat pipe.

3. The portable electronic device as claimed in claim 1, wherein the circuit board is disposed adjacent to a side surface of the battery module.

4. The portable electronic device as claimed in claim 1, wherein the battery module leans against the shell, wherein an upper surface of the battery module and the arc-shaped surface define the gap.

5. The portable electronic device as claimed in claim 1, further comprising:
   a display module, disposed in the accommodating space and located between the cover plate and the battery module.

6. The portable electronic device as claimed in claim 1, wherein the battery module comprises an extending portion protruding from an upper surface of the battery module, wherein a top surface of the extending portion and the arc-shaped surface define the gap.

* * * * *